Patented May 5, 1931

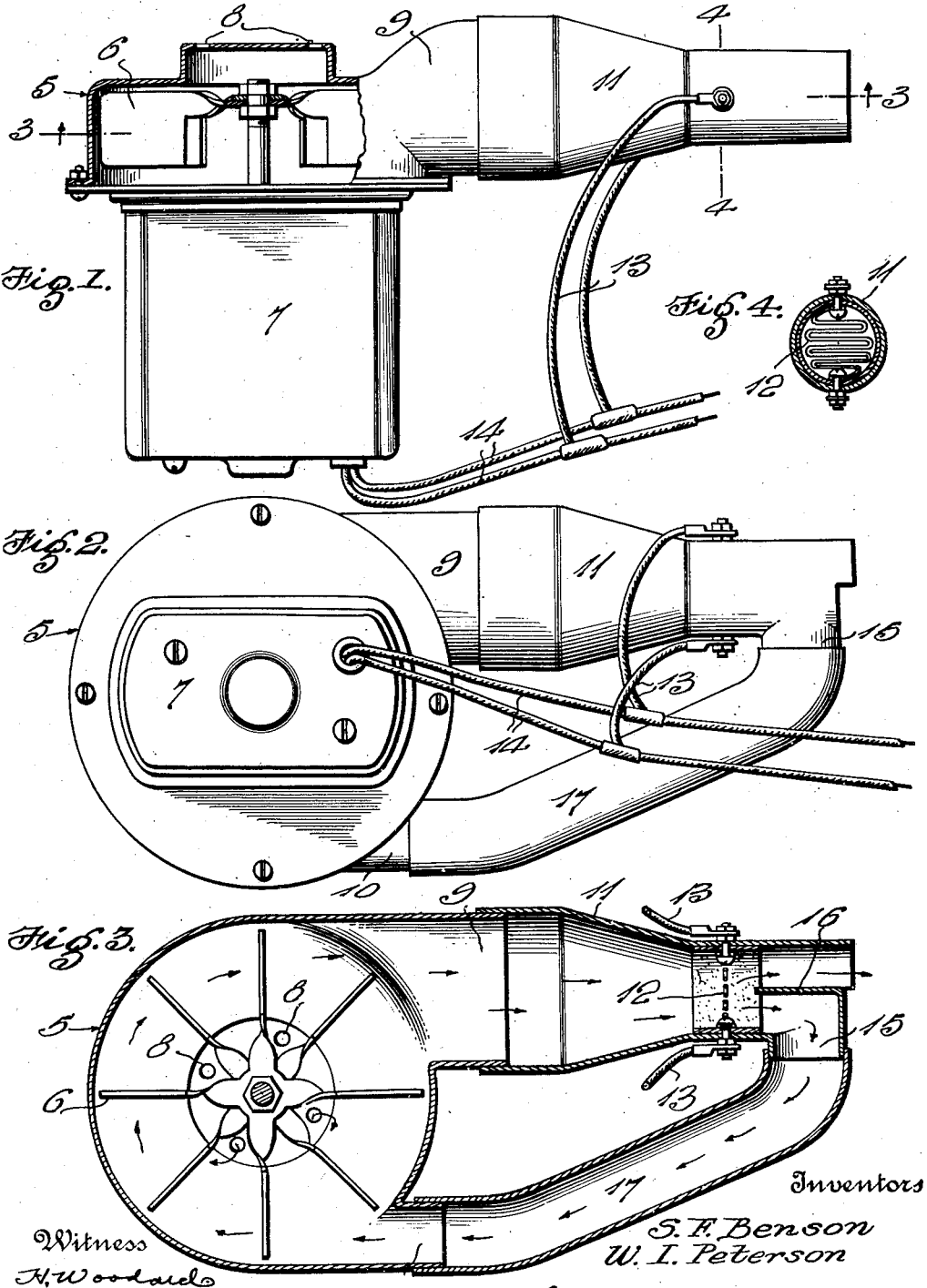

1,803,421

UNITED STATES PATENT OFFICE

STEWART F. BENSON AND WERNER I. PETERSON, OF BRAINERD, MINNESOTA

DRIER

Application filed February 21, 1930. Serial No. 430,421.

The invention relates to improvements in driers of the general type which usually embodies a motor-driven air blower and electric heating means for heating the air to desired temperature before discharge from the blower outlet.

It is the object of the present invention to provide a drier of the general type above mentioned, with unique means for returning part of the heated air into the blower casing to be reheated, while allowing the remainder of the heated air to escape. It is thus insured that the air may be raised to a higher temperature, for all of the air must pass a number of times through the heater before it finally escapes.

It is our primary intent to provide a drier of the described characteristics which is well adapted for operation by the usual six volt battery of an automobile, enabling use of said drier in drying wet ignition parts, thawing frozen carbureters and possibly radiators, warming the hands while making repairs or adjustments, thawing frost or ice from the windshield, etc., it being possible also to mount the entire device in an appropriate fixed position at the inside of the windshield to maintain the latter at such a temperature as to prevent accumulation of frost, snow and ice thereon.

With the foregoing and minor objects in view, the invention resides in the novel subject matter hereinafter described and claimed, description being accomplished by reference to the accompanying drawing.

Fig. 1 is a side elevation partly broken away and in section.

Fig. 2 is a side elevation looking in a direction at right angles to Fig. 1.

Fig. 3 is a longitudinal sectional view on line 3—3 of Fig. 1.

Fig. 4 is a detail transverse section on line 4—4 of Fig. 1.

The drawing above briefly described illustrates one advantageous form of construction and while such construction will be herein rather specifically described, it is to be understood that within the scope of the invention as claimed, variations may be made.

The numeral 5 denotes a substantially flat, cylindrical, blower housing containing an appropriate blower fan 6 which is driven by an electric motor 7. The casing 5 is provided at the eye of the fan 6, with restricted air inlet means, such as the perforations 8, and the periphery of said casing 5 is provided both with an air outlet 9 and with an air inlet 10. An open-ended air discharge nozzle 11 projects outwardly from the air outlet 9, and an appropriate electric heater 12 extends across and is insulated from said nozzle for heating the air passing therethrough. Current conductors 13 for the heater are shown connected with the current conductors 14 for the motor 7, and one switch (not shown) may be employed for controlling the feeding of current to both the motor and the heater.

The nozzle 11 is provided, beyond the heater 12, with a lateral air outlet 15, and an air deflector 16 is disposed across said nozzle between said heater and the nozzle extremity, for deflecting some of the heated air through said lateral outlet 15. An air conducting pipe 17 leads from the outlet 15 to the inlet 10 of the blower casing 5 and hence all air passing through said outlet 15, is returned to the casing 5 to be again discharged by the fan 6, being consequently again heated by the electric heater 12. By thus returning some of the heated air continuously for reheating, it is insured that all air discharged from the front end of the nozzle 11, shall be at an unusually high temperature, to produce maximum heating and drying efficiency.

The construction of the device is rather simple and inexpensive, its operation is economical, and its uses are many and varied. The principal purposes for which the device is designed, have been herein before enumerated, but it is to be understood that it is not restricted to any particular use or uses. Moreover, attention is again invited to the fact that within the scope of the invention as claimed, variations may be made.

We claim:—

1. In a drier of the type embodying an air blower having an outlet nozzle and an electric air heater across said nozzle; a lateral outlet from a portion of said nozzle beyond said heater, an air deflector within said nozzle for deflecting some of the heated air through said lateral outlet, and an air return passage leading from said lateral outlet into the casing of the blower, whereby to return part of the heated air for reheating.

2. A drier comprising a blower casing and a blower fan therein, said casing having a restricted air inlet at the eye of said fan and both an air inlet and an air outlet at the periphery of the casing, an open-ended air discharge nozzle projecting from said air outlet, an electric heater extending across the nozzle, said nozzle having a lateral outlet beyond the heater, an air deflector in the nozzle for deflecting part of the heated air through said lateral outlet, and a return passage leading from said lateral outlet to the peripheral air inlet of the blower casing, whereby to return part of the heated air for reheating.

In testimony whereof we have hereunto affixed our signatures.

STEWART F. BENSON.
WERNER I. PETERSON.